US 8,830,612 B2

(12) United States Patent
Worrell et al.

(10) Patent No.: US 8,830,612 B2
(45) Date of Patent: Sep. 9, 2014

(54) HARDWARE-BASED INTER-TRACK INTERFERENCE MITIGATION IN MAGNETIC RECORDING SYSTEMS WITH READ CHANNEL STORAGE OF CANCELATION DATA

(75) Inventors: Kurt J. Worrell, Berthoud, CO (US); Erich F. Haratsch, Bethlehem, PA (US)

(73) Assignee: LSI Corporation, San Jose, CA (US)

( * ) Notice: Subject to any disclaimer, the term of this patent is extended or adjusted under 35 U.S.C. 154(b) by 64 days.

(21) Appl. No.: 13/460,204

(22) Filed: Apr. 30, 2012

(65) Prior Publication Data

US 2013/0083418 A1 Apr. 4, 2013

Related U.S. Application Data

(63) Continuation-in-part of application No. 13/250,246, filed on Sep. 30, 2011.

(51) Int. Cl.
*G11B 5/09* (2006.01)
*G11B 5/012* (2006.01)
*G11B 19/04* (2006.01)

(52) U.S. Cl.
CPC *G11B 5/09* (2013.01); *G11B 5/012* (2013.01); *G11B 19/045* (2013.01)
USPC .............................................. 360/39; 360/55

(58) Field of Classification Search
None
See application file for complete search history.

(56) References Cited

U.S. PATENT DOCUMENTS

| 6,532,272 B1* | 3/2003 | Ryan et al. ...................... 360/65 |
| 2002/0131351 A1* | 9/2002 | Taguchi et al. ............ 369/53.33 |
| 2007/0047131 A1 | 3/2007 | Berman et al. |
| 2007/0104078 A1 | 5/2007 | Yin et al. |
| 2012/0063022 A1 | 3/2012 | Mathew et al. |
| 2012/0063023 A1* | 3/2012 | Mathew et al. ................. 360/53 |
| 2012/0063024 A1* | 3/2012 | Mathew et al. ................. 360/55 |
| 2013/0021689 A1* | 1/2013 | Haratsch et al. ................ 360/45 |
| 2013/0070362 A1* | 3/2013 | Mathew et al. ................. 360/65 |

OTHER PUBLICATIONS

Roh et al., Single-Head/Single-Track Detection in Interfering Tracks, IEEE Transactions on Magnetics, vol. 38, No. 4, pp. 1830-1838 (Jul. 1, 2002).
Cassuto et al., "Indirection Systems for Shingled-Recording Disk Drives," 26th IEEE Conference on Mass Storage Systems and Technologies, (May 3-7, 2010).

* cited by examiner

*Primary Examiner* — Thang Tran
(74) *Attorney, Agent, or Firm* — Ryan, Mason & Lewis, LLP

(57) ABSTRACT

Hardware-based methods and apparatus are provided for inter-track interference mitigation in magnetic recording systems. Inter-track interference (ITI) cancellation data is stored in a memory of a read channel of a magnetic recording system. The memory can be in a write data path or a read data path of the read channel. The inter-track interference cancellation data is optionally provided to an inter-track interference mitigation circuit using at least a portion of a write data path, for example, based on a control signal. The storage of the inter-track interference cancellation data can be in response to a second control signal.

44 Claims, 6 Drawing Sheets

500

550

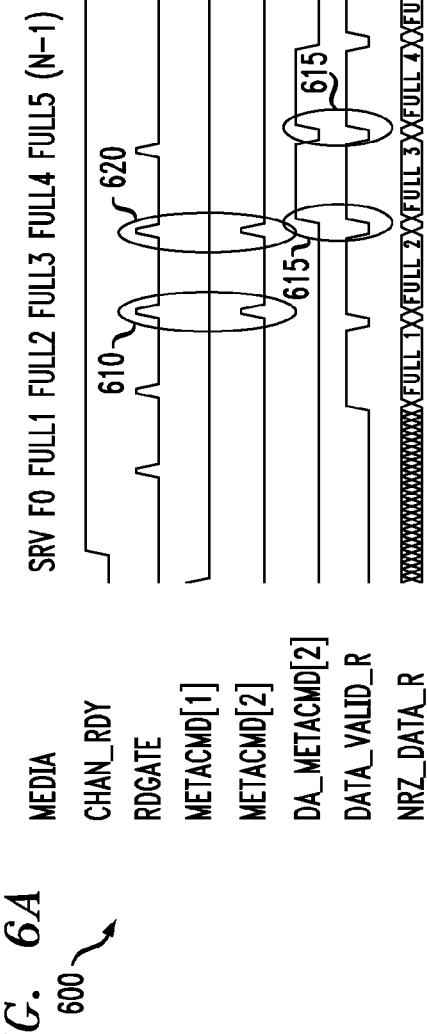
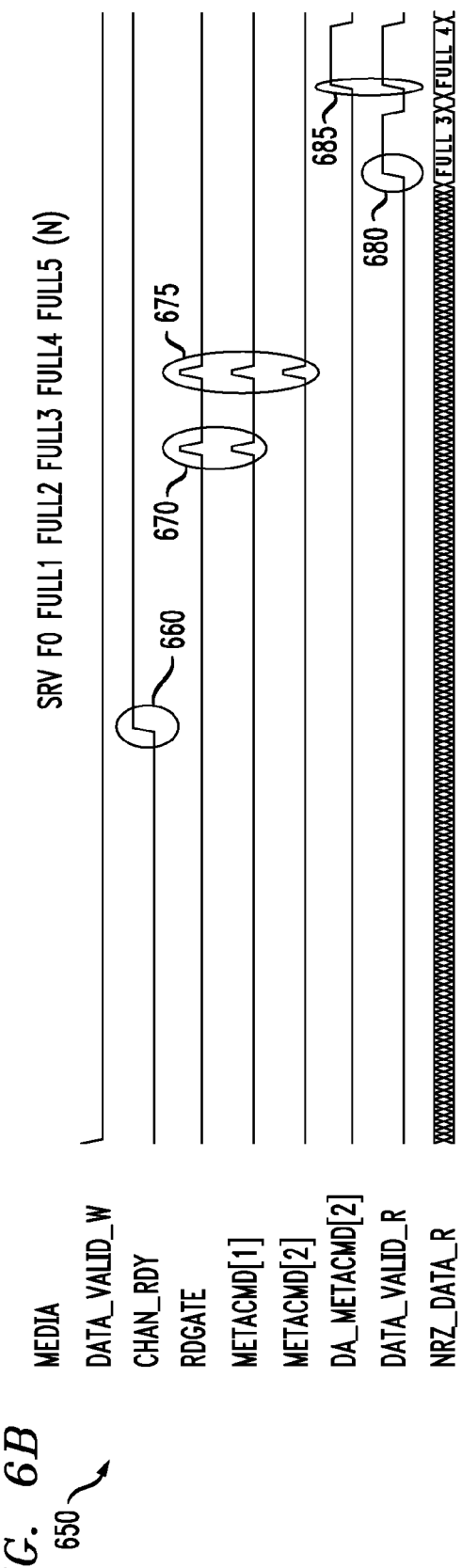

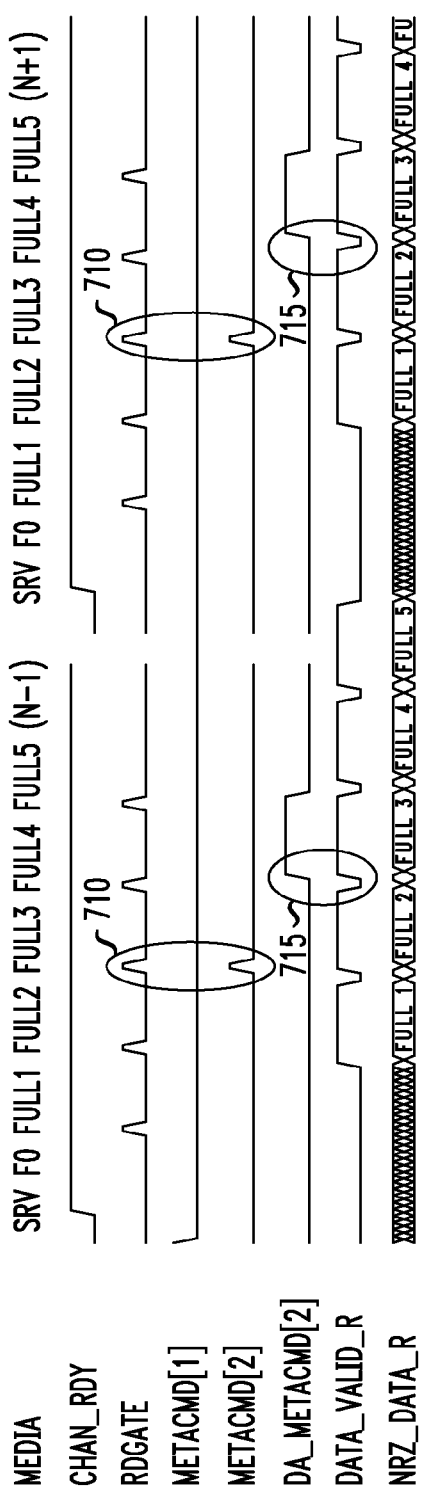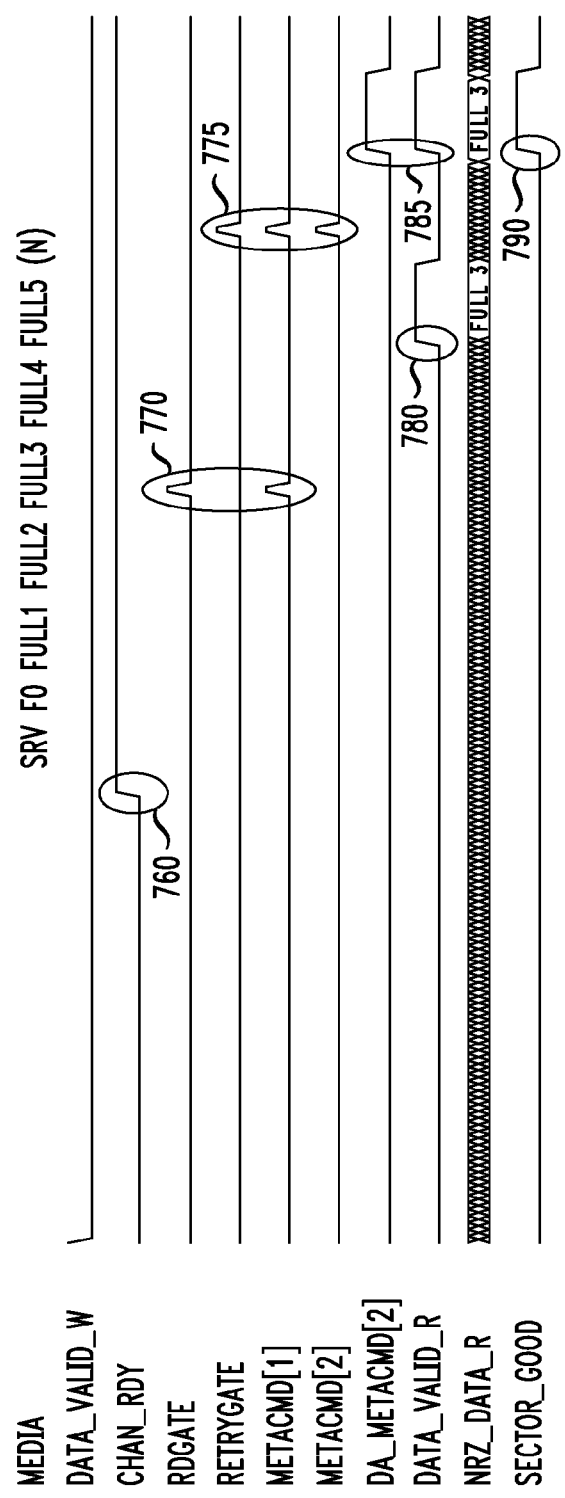

HARDWARE-BASED INTER-TRACK INTERFERENCE MITIGATION IN MAGNETIC RECORDING SYSTEMS WITH READ CHANNEL STORAGE OF CANCELATION DATA

CROSS-REFERENCE TO RELATED APPLICATION

This application is a continuation-in-part application of U.S. patent application Ser. No. 13/250,246, filed Sep. 30, 2011, entitled "Hardware-Based Methods and Apparatus for Inter-Track Interference Mitigation in Magnetic Recording Systems," incorporated by reference herein.

BACKGROUND OF THE INVENTION

In magnetic recording (MR) systems, data is typically recorded on concentric circular tracks on a magnetic media as a sequence of small magnetic domains. Data written onto the tracks that neighbor a given track will affect the signal read back from the media of the given track. The signal induced during the read of the given track as a result of one or more neighboring tracks is referred to as crosstalk or inter-track interference (ITI). The mitigation of the ITI noise caused by the neighboring tracks in the read back signal of the given track typically relies on cancellation data based on the data pattern from the neighboring tracks. The cancellation data is typically supplied to an ITI mitigation circuit or process as the given track is being read from the magnetic media. The neighboring tracks may be, for example, logically to the left and right of the given track.

ITI is of particular concern in hard disk drives (HDD) where concentric or spiral tracks of data are recorded on the media in close proximity to one another, relative to the size of the read head. The capacity of the disk drive is increased by placing the tracks closer together. ITI is known to increase with technology scaling, however, and becomes a significant source of noise as track separation distances become smaller. As the tracks are placed closer together, the neighboring tracks are more likely to influence the signal of the given track when it is read back from the media, reducing the overall signal-to-noise ratio. ITI thus limits the number of tracks that can reliably be stored in a given area of a magnetic medium. ITI is of even greater concern in Shingled Magnetic Recording (SMR) systems, where the tracks are placed close enough that the tracks touch one another in some cases and in other cases can even overlap one another when written with data.

A number of techniques have been proposed for mitigating the effect of ITI in magnetic recording systems. In existing SMR implementations, for example, the mitigation process is typically performed by software in the hard disk controller (HDC). It has been found, however, that when ITI mitigation is enabled, the HDC cannot process data fast enough to recover more than one sector of data for multiple revolutions of the disk. Each revolution of the disk, however, may contain, for example, 500 or more sectors of data (depending on, e.g., the particular disk drive that is employed, the size of the disk and the radial position of each track on the disk).

U.S. patent application Ser. No. 13/250,246, filed Sep. 30, 2011, entitled "Hardware-Based Methods and Apparatus for Inter-Track Interference Mitigation in Magnetic Recording Systems," mitigates ITI by providing ITI cancellation data during a read operation to an ITI mitigation circuit using a write data path of a read channel in the magnetic recording system. The ITI cancellation data can be obtained, for example, from an external memory. While the disclosed ITI mitigation techniques effectively reduce ITI in such magnetic recording systems, a need remains for ITI mitigation techniques that store the ITI cancellation data within the read channel.

SUMMARY OF THE INVENTION

Generally, hardware-based methods and apparatus are provided for inter-track interference mitigation in magnetic recording systems. According to one aspect of the invention, inter-track interference (ITI) cancellation data is stored in a memory in a read channel of a magnetic recording system. The memory can be in a write data path or a read data path of the read channel. The inter-track interference cancellation data is optionally provided to an inter-track interference mitigation circuit using at least a portion of a write data path, for example, based on a first control signal. The storage of the inter-track interference cancellation data can be in response to a second control signal.

The inter-track interference cancellation data can be selectively obtained, for example, from a read data path based on the second control signal, for example, based on the second control signal that is substantially aligned with recovered data. The inter-track interference cancellation data can be selectively obtained from the read data path, for example, using a multiplexer. The multiplexer can select data from a read data path and/or data from a hard disk controller. The selected data from the read data path can be provided to a write data path for storage in the memory. In one exemplary implementation, the selected data from the read data path is in a user data format and/or a media data format.

According to another aspect of the invention, a read channel of a magnetic recording system is provided that comprises means for obtaining inter-track interference cancellation data; and a memory for storing the inter-track interference cancellation data. In addition, the read channel optionally further comprises means for selectively storing the inter-track interference cancellation data in the memory based on a control signal.

The inter-track interference mitigation techniques of the illustrative embodiments overcome one or more of the problems associated with the conventional techniques described previously, and provide improved inter-track interference mitigation by storing the cancellation data in a memory within the read channel. Moreover, existing memories that are otherwise idle can be employed such that the present invention can be implemented in existing read channels without adding any new internal memory. These and other features and advantages of the present invention will become more readily apparent from the accompanying drawings and the following detailed description.

BRIEF DESCRIPTION OF THE DRAWINGS

FIGS. 5 through 7 illustrate interface signals for a number of exemplary modes of operation.

DETAILED DESCRIPTION

Figure 1:
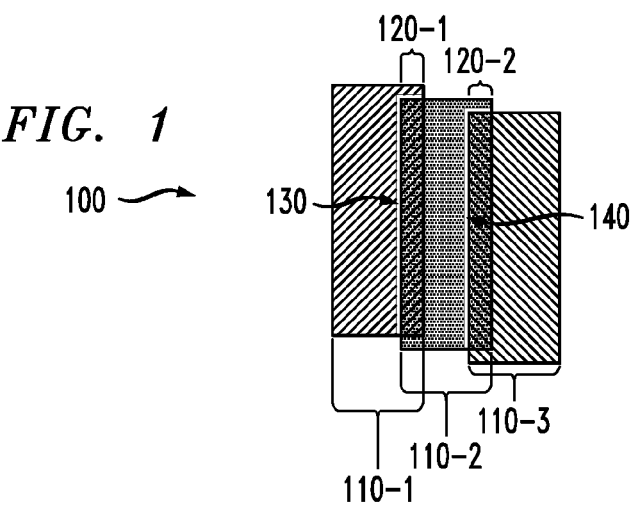
FIG. 1 illustrates a portion of a number of exemplary tracks on a magnetic medium of a Shingled Magnetic Recording (SMR) system.

The present invention provides hardware-based methods and apparatus for inter-track interference mitigation in magnetic recording systems. ITI mitigation combines the data read from the media with additional data (hereafter referred to as "cancellation data") in order to improve the likelihood of correct data recovery. The cancellation data must be supplied to the ITI mitigation circuit or process. According to one aspect of the invention, the cancellation data is obtained from a memory within the read channel. In this manner, ITI mitigation can be performed without changing the hard disk controller, or requiring the hard disk controller to provide additional capacity to transfer or store the cancellation data. In one exemplary implementation, at least a portion of the cancellation data is collected during a read operation of one or more neighboring tracks and transferred directly into the write data path where it can be encoded (if needed) and stored, to await a subsequent read of the center track.

According to further aspects of the invention, the disclosed hardware-based techniques for inter-track interference mitigation obtain the cancellation data from a local memory within the read channel and do not require the processing unit in the HDC to perform the ITI computations. According to another aspect of the invention, a system is disclosed for storing, supplying and manipulating the cancellation data for presentation to the read data path for subsequent digital signal processing (DSP), thereby improving the chances for correctly recovering the written data.

Read channels (RCs) are typically slave devices that are in either a read mode or a write mode at a given time. In each mode, data typically flows only in one direction. For example, data flows from a hard disk controller (HDC) to the read channel (RC) to the media in a write mode and from the media to the RC and then the HDC in a read mode. At least a portion of the write data path (WDP) is normally idle when the read channel is executing a read operation in a read mode.

Thus, as discussed further below, the write data path (which is normally idle or dormant during read operations) is employed to deliver the cancellation data from a local memory to an ITI mitigation circuit in the read data path. Thus, the write data path is used during read operations to provide cancellation data into the read channel. Thus, the read data path is used to collect read data, and the write data path is used to store cancellation data and to supply the stored cancellation data to the read data path.

In one exemplary embodiment, the cancellation data is provided to the ITI mitigation circuit substantially simultaneously with the media data that is obtained by the read data path from the magnetic media. In another exemplary embodiment, the cancellation data is provided to the ITI mitigation circuit before or after the corresponding media data that is obtained by the read data path from the magnetic media. Among other benefits, the write data path typically includes functionality to encode, scramble and buffer data, and calculate error correction data (which is subsequently written to the media), and this functionality can be leveraged in accordance with the present invention for ITI mitigation. In this manner, the disclosed ITI mitigation system makes use of otherwise idle hardware and existing buffering capabilities in the write path to enable ITI mitigation, with reduced design effort, area expense and power costs.

FIG. 1 illustrates a portion of a number of exemplary tracks 110-1 through 110-3 on a magnetic medium 100 of an exemplary Shingled Magnetic Recording (SMR) system. The tracks 110-1 through 110-3 are typically written in increasing numerical order (such as illustrated from left to right in FIG. 1). A number of examples described herein make reference to adjacent tracks, such as left and right tracks, which are references to the tracks that are logically adjacent to the left and right, respectively, of a given track. Other examples described herein may make reference to neighboring tracks, which are references to the tracks that are in the vicinity of a given track, but not necessarily immediately adjacent to the given track.

As shown in FIG. 1, the exemplary tracks 110-1, 110-2 and 110-3 are written with a first overlap region 120-1 between tracks 110-1 and 110-2, and with a second overlap region 120-2 between tracks 110-2 and 110-3. The signal read from track 110-2, for example, is heavily influenced by the signal read from track 110-3 since track 110-3 is written overlapping the previously written track 110-2. The signal read from track 110-2 is also influenced by the data previously written on track 110-1 since the left edge of track 110-2 is written over the right edge of track 110-1. The read signal for track 110-2 depends heavily on the position and size of the read head that is positioned over the tracks to read the recorded data. If the read head is positioned closer to one edge of track 110-2, such as edge 130, than the edge of the other track 110-3, such as edge 140, for example, then the corresponding track 110-1 that is adjacent to edge 130 will affect the read signal of track 110-2 more than the track 110-3 that is adjacent to edge 140. If the read head is the same size or larger than the non-overlapped region of track 110-2, both tracks 110-1 and 110-3 are likely to induce ITI noise to track 110-2.

Thus, one adjacent track can have a more significant ITI effect than the other adjacent track. For example, the position of the read head over the center track 110-2 relative to the position of the adjacent tracks 110-1 and 110-3, as well as the position of the read head relative to the midline of the center track 110-2, may influence the amount of ITI contributed by each adjacent track to the center track. Thus, ITI mitigation can optionally be performed first for the adjacent track having the more significant ITI contribution. As discussed further below, the illustrative embodiments described herein do not place any restrictions on the number of tracks that may be used for ITI mitigation, or on using one or more tracks from one side of the given track or the other side of the given track, or the order of side tracks if two-sided ITI mitigation is being performed. The disclosed ITI mitigation mechanisms allow for the most important cancellation (if known a priori) to be performed first so as to allow the ITI mitigation process to terminate once successful data recovery is achieved.

While the present invention is illustrated herein in the context of exemplary SMR systems, it is again noted that ITI occurs even in non-shingled systems. Even if a magnetic medium is comprised of tracks 110 that do not overlap (e.g., there is a small gap between tracks), the magnetic medium may appear as if it were shingled if the write head were to stray off track during a write operation (i.e., the gap and some of the adjacent track would be overwritten and appear much like the SMR system illustrated in FIG. 1). Thus, the disclosed ITI mitigation techniques can be applied to any magnetic recording system. as would be apparent to a person of ordinary skill in the art.

Figure 2:
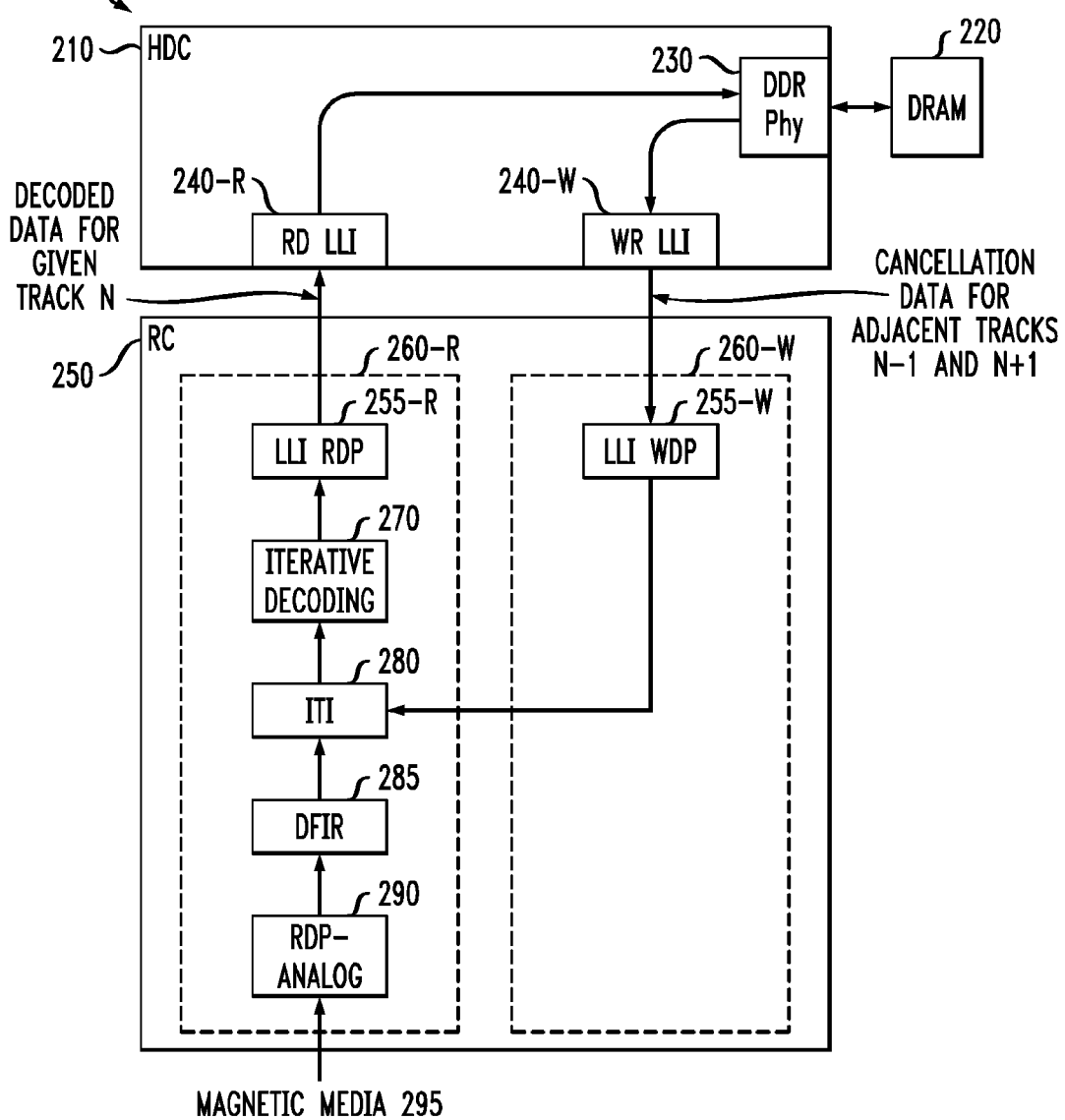
FIG. 2 is a schematic block diagram of portions of a magnetic recording system incorporating ITI mitigation in accordance with the teachings of U.S. patent application Ser. No. 13/250,246.

FIG. 2 is a schematic block diagram of portions of a magnetic recording system 200 incorporating ITI mitigation in accordance with the teachings of U.S. patent application Ser. No. 13/250,246, filed Sep. 30, 2011, entitled "Hardware-Based Methods and Apparatus for Inter-Track Interference Mitigation in Magnetic Recording Systems," incorporated by reference herein. FIG. 2 illustrates the configuration of the magnetic recording system 200 for ITI mitigation during a read operation, where an external memory 220 is used. As shown in FIG. 2, the magnetic recording system 200 comprises a hard disk controller (HDC) 210 and a read channel (RC) 250. The read channel 250 comprises a read data path (RDP) 260-R and a write data path (WDP) 260-W. As previously indicated, the write data path 260-W is employed to deliver the cancellation data for one or more adjacent tracks, such as tracks N−1 and N+1, that are adjacent to a given track N to an ITI mitigation circuit 280 in the read data path 260-R. The cancellation data is provided to the ITI mitigation circuit 280 substantially simultaneously with the media data that is obtained by the read data path 260-R from the magnetic media. In another exemplary embodiment, the cancellation data is provided to the ITI mitigation circuit 280 before or after the corresponding media data that is obtained by the read data path 260-R from the magnetic media.

Typically, the RDP-Analog block 290 comprises a number of analog components, such as an AC-coupling (ACC), attenuator; a variable gain amplifier (VGA) with adaptive control, baseline compensation, magneto-resist asymmetric (MRA) compensation, thermal asperity (TA) detection; continuous time filter (CTF) with adaptive control for digital signal processing; and an analog-to-digital converter (ADC). Generally, thermal asperity occurs when the read head encounters a portion of magnetic material that is raised above the plane of the disk platter on which the magnetic material resides, causing the signal amplitude to substantially increase. The thermal asperity detection block identifies such magnetic material portions and attempts to compensate for them, in a known manner.

The digitized signal is then filtered by a Digital Finite Impulse Response (DFIR) filter 285, which equalizes the signal. The DFIR filter 285 provides a filtered output to the ITI mitigation circuit 280. The ITI-cancelled signals generated by the ITI mitigation circuit 280 are then provided to the iterative decoding block 270 that includes a Viterbi detector and a decoder, such as a low-density parity check decoder. The read data path 260-R provides decoded data for a given track N to the hard disk controller 210.

As previously indicated, the write data path 260-W typically includes functionality to encode the data that is to be written onto the media, such that error correction can be performed on a subsequent read of the data. In addition, the write data path 260-W also scrambles and buffers the data, and this functionality can be leveraged in accordance with the present invention for ITI mitigation.

For a more detailed discussion of an exemplary ITI mitigation circuit 280, see, for example, U.S. patent application Ser. No. 13/186,174, filed Jul. 19, 2011, entitled "Systems and Methods for Inter-Track Interference Compensation," incorporated by reference herein. A number of exemplary techniques for ITI mitigation in accordance with the present invention are discussed further below in conjunction with FIGS. 5-7. For example, various implementations support direct reads of the magnetic media 295, with or without ITI mitigation. In addition, another implementation supports on-the-fly (OTF) or real-time read operations with at least one-sided ITI mitigation. Yet another implementation supports offline reads with up to two-sided ITI mitigation.

The magnetic recording system 200 of FIG. 2 also supports ITI mitigation of post-processed DFIR data, such as Y-Averaged data and/or post-processing of ITI mitigated DFIR data, such as Y-Averaging of ITI mitigated data. For a more detailed discussion of post-processed DFIR data and ITI mitigated DFIR data, see, for example, U.S. patent application Ser. No. 13/250,246, filed Sep. 30, 2011, entitled "Hardware-Based Methods and Apparatus for Inter-Track Interference Mitigation in Magnetic Recording Systems," incorporated by reference herein. For example, ITI mitigation of Y-Averaged data comprises obtaining a Y-Average over multiple reads and then performing ITI mitigation and decoding using the Y-averaged samples. Similarly, Y-Averaging of ITI mitigated data comprises reading a sector, performing ITI mitigation and optionally decoding using the current read sector, and obtaining a Y-Average using the ITI-mitigated samples from multiple reads, followed by a read of a next sector, and so forth.

As shown in FIG. 2, the hard disk controller 210 comprises exemplary long latency interfaces (LLI) 240-R, 240-W for communicating with corresponding long latency interfaces (LLI) 255-R, 255-W in the read data path (RDP) 260-R and write data path (WDP) 260-W, respectively.

The hard disk controller 210 also includes a double data rate (DDR) PHY interface 230 for communicating with external DDR devices, such as a dynamic random access memory (DRAM) 220. In FIG. 2, the cancellation data can be stored, for example, in the external DRAM 220 or another memory, such as a volatile static random access memory (SRAM) or a non-volatile flash memory. The exemplary DRAM 220 can store cancellation data for one or more tracks of the magnetic media 100 (FIG. 1) or magnetic media 295 (FIG. 2). For example, the amount of cancellation data that is stored can be a function of the track spacing for the track currently being read. The exemplary DRAM 220 may also store cancellation data for just one or multiple sectors (for example, the sectors that could not be successfully recovered during a prior read operation) to reduce the amount of data that needs to be stored in DRAM 220.

The cancellation data, also referred to as side-track data, can have a number of exemplary formats, as would be apparent to a person of ordinary skill in the art. Generally, the exemplary cancellation data can comprise coded media data that corresponds to the written media waveform, or un-encoded user data which would normally be supplied by the hard disk controller 210. Generally, the exemplary media data format comprises encoded data including Low Density Parity Check (LDPC) overhead, run-length limited (RLL) encoding overhead and error detection code (EDC) overhead.

Figure 3:
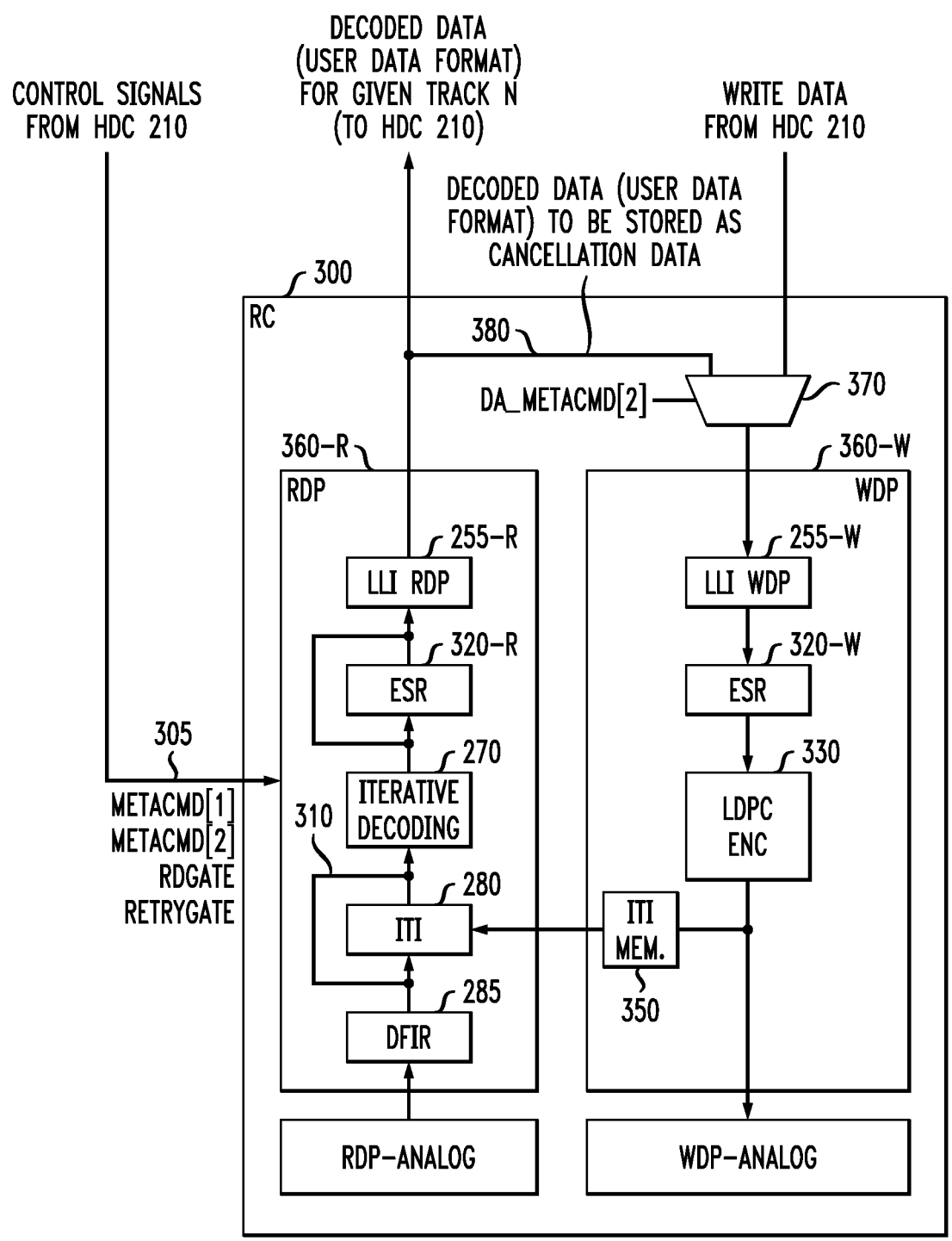
FIGS. 3 and 4 are schematic block diagrams of portions of a magnetic recording system incorporating ITI mitigation in accordance with the present invention using storage of the cancellation data within the read channel.
Figure 4:
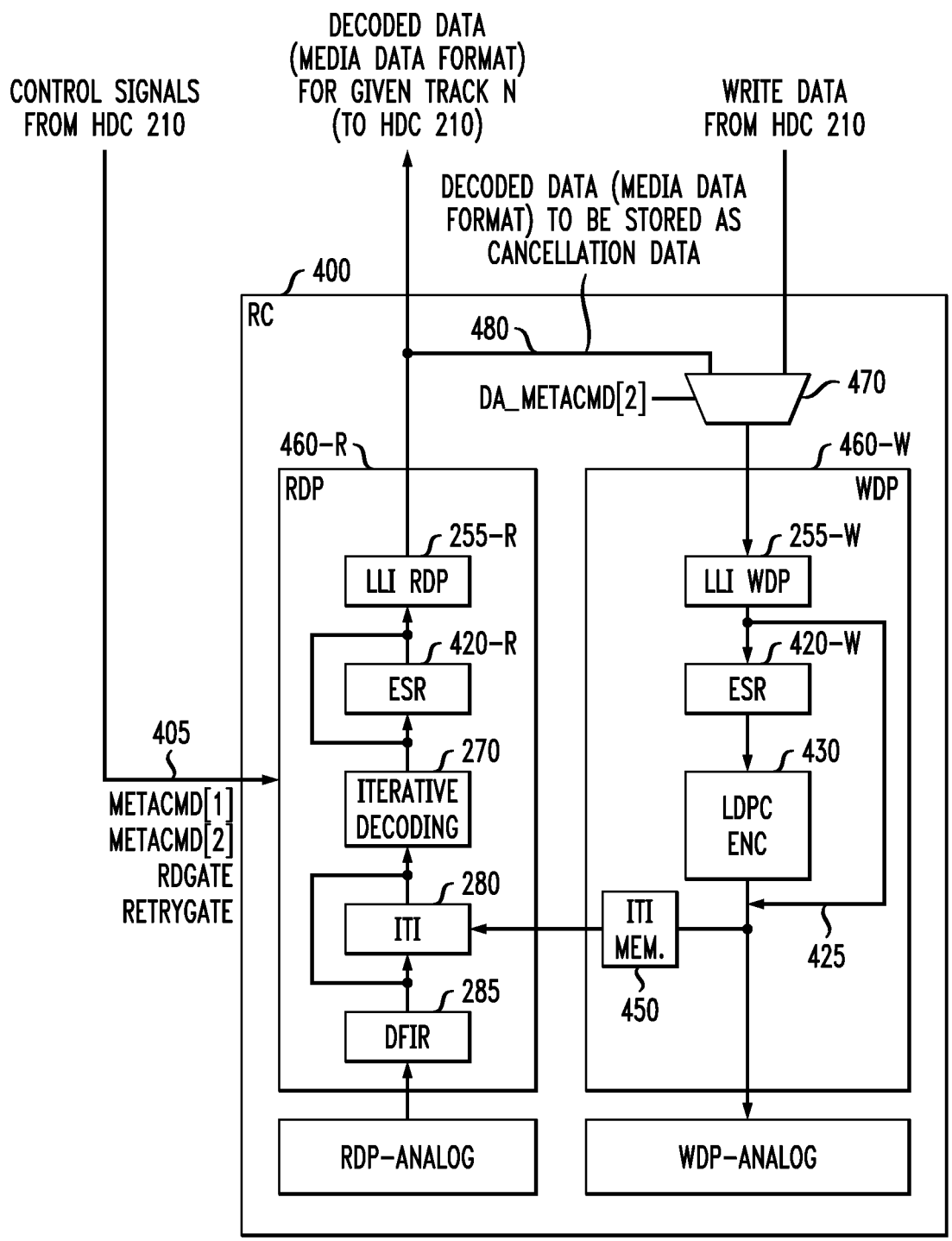

FIGS. 3 and 4, discussed further below, are schematic block diagrams of portions of a magnetic recording system 300, 400, respectively, incorporating ITI mitigation in accordance with the present invention using storage within the read channel. As discussed hereinafter, FIGS. 3 and 4 illustrate different embodiments from each other for processing the data. It is noted that the embodiments of FIGS. 3 and 4 can be integrated into a single system that can be selectively configured between either embodiment based on the type of data (e.g., coded media data or un-encoded user data) that is being processed. In FIGS. 3 and 4, the run-length limited and error detection code encoder and decoder functions and the scrambler functions are labeled as "ESR" (i.e., Error Detection Code, Scrambler and RLL).

It is further noted that in the exemplary embodiment of FIG. 2, the ITI mitigation circuit 280 processes equalized analog-to-digital converter (ADC) samples, referred to as "Y-Data." In an alternative embodiment, the ITI mitigation circuit 280 may process raw (unequalized) ADC samples, referred to herein as "ADC data." The Y-Data or ADC data, for example, may be 6 bits of data for each media bit that was written on the media. The ADC-data or Y-Data is read from the magnetic media 295 and is available at the output of the ADC or DFIR equalizer, respectively. The iterative decoding block 270 converts each Y-Data sample to a single bit of detected media data (and after removal of parity and other overhead bits) to a single bit of detected user data. The iterative decoding block 270 may be embodied, for example, using a well-known LDPC decoder.

The write data path 260-W can alternatively represent the ITI cancellation data in user or media data format. In an alternative embodiment, the write data path 260-W represents the ITI cancellation data in ADC or Y-data format, in which case multiple bits per media bit are stored in the DRAM and supplied from the HDC to the write data path 260-W. The ITI mitigation circuit 280 mitigates ITI based on media data. ADC data or Y-data depending on what the write data path 260-W supplies. If the HDC provides ITI cancellation data to the read channel in user data format, the write data path converts the user data to media data as described in FIGS. 3 and 4.

Control Signals

In one exemplary embodiment, the magnetic recording system 200 includes an ITI control signal or register, referred to, for example, as METACMD[1] or ITI_GATE, to indicate whether ITI cancellation data should be used for a given read operation. If the ITI control signal indicates that the ITI cancellation data should not be used for a given read operation, then the ITI mitigation circuit 280 can optionally be bypassed (as there is no data to be used for ITI mitigation), as shown further below in FIGS. 3-4. In addition, the exemplary magnetic recording system 200 optionally includes a mode control signal or register, referred to, for example, as ITI_SIDES, to indicate whether ITI cancellation is to be performed for only one adjacent track (for example, ITI_SIDES is set to ITI_SIDES=0) or two adjacent tracks (for example, ITI_SIDES is set to ITI_SIDES=1) in the exemplary embodiment. In general, any number, N, of tracks can have an ITI influence on the center track. In addition, M-sided ITI mitigation can be performed in accordance with the present invention in M steps, as would be apparent to a person of ordinary skill in the art.

In addition, an ITI control signal or register, referred to, for example, as METACMD[2], can be used to indicate whether the current read data in the read data path 260-R should be transferred from the read data path 260-R to the write data path 260-W for storage in an ITI memory, from where it can subsequently be used as ITI cancellation data. The exemplary ITI control signals or registers, such as METACMD[1] and METACMD[2], are discussed further below in conjunction with FIGS. 5 through 7.

FIG. 3 is a schematic block diagram of a read channel 300 incorporating ITI mitigation using storage within the read channel. As shown in FIG. 3, the exemplary read channel 300 comprises a read data path 360-R and a write data path 360-W. in a similar manner to FIG. 2. The read data path 360-R may be implemented in a similar manner to the read data path 260-R of FIG. 2. As previously indicated, the write data path 360-W is employed by the present invention to store and provide ITI cancellation data to an ITI mitigation circuit 280 in the read data path 360-R. In the embodiment of FIG. 3, the decoded data from the read data path 360-R that is to be stored in the write data path 360-W is in a user data format, and the write data path 360-W generates the media data for storage in an ITI memory 350 and subsequent presentation to the ITI mitigation circuit 280.

During an ITI mitigation mode, the cancellation data is provided by the write data path 360-W to the ITI mitigation circuit 280 substantially simultaneously with the media data that is obtained by the read data path 360-R from the magnetic media. In another exemplary embodiment, the cancellation data is provided to the ITI mitigation circuit 280 before or after the corresponding media data that is obtained by the read data path 360-R from the magnetic media.

The long latency interfaces (LLI) 255-R, 255-W in the read data path (RDP) 360-R and write data path 360-W, respectively, may be implemented in a similar manner to FIG. 2. In addition, the iterative decoding block 270 and ITI mitigation circuit 280 may be implemented in a similar manner to FIG. 2.

As shown in FIG. 3, the read data path 360-R generates the decoded data for a given track N that is provided to the HDC 210 (FIG. 2). In addition, the generated decoded data for a given track N can optionally be transferred for storage in the write data path 360-W in accordance with the present invention. The read channel 300 includes a shunt path 380 for transferring the decoded data to be stored as cancellation data in the write data path 360-W. In addition, a multiplexer 370 is controlled by DA_METACMD[2]. a delayed. data aligned version of METACMD[2]. The multiplexer 370 allows a selection of either the shunted decoded data from the read data path 360-R or the write data from the HDC 210.

In the exemplary embodiment of FIG. 3, the coded media data is generated by the write data path 360-W. In various modes, the HDC 210 provides write data to the write data path 360-W to be stored on the magnetic media 295 (or stored as ITI cancellation data), or the read data path 360-R provides decoded data to the write data path 360-W to be stored as ITI cancellation data in a user data format. as controlled by multiplexer 370. In a first exemplary mode, the multiplexer 370 selects the write data from the HDC 210, which is then encoded in the write data path 360-W and written to the magnetic media 295 (FIG. 2) in a normal write operation. In a second exemplary mode, the multiplexer 370 selects the shunt path 380 that transfers the decoded data from the read data path 360-R that is to be stored as cancellation data in the write data path 360-W. In the exemplary embodiment of FIG. 3, during the second mode, the decoded data is encoded by an ESR encoder 320-W and an LDPC encoder 330, which encode the user data to coded media data. The coded media data is stored in an ITI memory 350 in accordance with an aspect of the present invention and then provided to the ITI mitigation circuit as ITI cancellation data. The write data path 360-W encodes the user data in a similar fashion as during a write operation to the media.

As discussed further below in conjunction with FIGS. 5 through 7, the control signal METACMD[2] is aligned with a RDGATE control signal (that initiates a read of the data from the magnetic media 295) when the decoded data from the read operation is to be stored in the write data path 360-W for subsequent use during an ITI mitigation mode. In a further variation discussed herein, the control signal METACMD[2] can be aligned with a RETRYGATE control signal. The control signal DA_METACMD[2] is a control signal that is generated in response to the assertion of control signal METACMD[2]. The control signal DA_METACMD[2] is delayed to align with the recovered data, which can be significantly later than the RDGATE signal. The exemplary read channel 300 provides a "control" interface 305 (e.g., control interface wires) from the HDC 210 to the read channel 300. The exemplary control interface 305 comprises control signals RDGATE, METACMD[1], METACMD[2] and RETRYGATE. Control signal METACMD[1] and [2] are single pulses in an exemplary embodiment. As discussed further below in conjunction with FIGS. 5 through 7, when the RDGATE signal is asserted, the exemplary read data path 360-R will initiate a read operation. In addition, when the METACMD[2] signal is asserted (aligned with the RDGATE signal or the RETRYGATE signal), the exemplary read channel 300 waits until the data is fully decoded (can be, e.g., thousands of cycles later), and then when the data is passed to the ESR/LLI 320-R. 255-R on the read data path 360-R, the data aligned version of METACMD[2] (DA_METACMD[2]) is also asserted.

The DA_METACMD[2] is asserted for as long as necessary to cover all the data in the current sector. As indicated above, the DA_METACMD[2] signal controls the MUX 370 in the write data path 360-W.

The ITI memory 350 can be embodied, for example, as a dynamic random access memory (DRAM) a static random access memory (SRAM), or a non-volatile memory, such as flash memory. The capacity of the ITI memory 350 can be established based on the amount of cancellation data to be stored. The physical location of the ITI memory 350 (on the same die as the rest of the chip or some type of off-chip memory) can be established, for example, based on the amount of cancellation data to be stored and cost or manufacturing constraints. In this manner, the read channel 300 can support ITI mitigation using any number of sectors and any number of neighboring tracks. The ITI memory 350 can store cancellation data for one or more sectors (or portions thereof) on one or more tracks of the magnetic media 100 (FIG. 1) or magnetic media 295 (FIG. 2). For example, the ITI memory 350 can store one or more sectors that could not be successfully recovered during a prior read operation.

As shown in FIG. 3, the ITI mitigation circuit 280 in the read data path 360-R can optionally be bypassed when ITI cancellation is not enabled for a given read operation. Furthermore, the ESR encoder 320-R in the read data path 360-R can optionally be bypassed when a media data format is to be recovered.

FIG. 4 is a schematic block diagram of a read channel 400 incorporating ITI mitigation using storage within the read channel, where the write data path provides media data to the ITI mitigation circuit 280. As shown in FIG. 4, the exemplary read channel 400 comprises a read data path 460-R and a write data path 460-W, in a similar manner to FIGS. 2 and 3. The read data path 460-R may be implemented in a similar manner to the read data path 260-R of FIG. 2. As previously indicated, the write data path 460-W is employed by the present invention to store and deliver the cancellation data to an ITI mitigation circuit 280 in the read data path 460-R. In the embodiment of FIG. 4, the decoded data from the read data path 460-R that is to be stored in the write data path 460-W is in a media data format, and the write data path 460-W stores the media data in an ITI memory 450 for subsequent presentation to the ITI mitigation circuit 280.

During an ITI mitigation mode, the cancellation data is provided by the write data path 460-W to the ITI mitigation circuit 280 substantially simultaneously with the media data that is obtained by the read data path 460-R from the magnetic media. In another exemplary embodiment or mode of operation, the cancellation data is provided to the ITI mitigation circuit 280 before or after the media data that is obtained by the read data path 460-R from the magnetic media.

The long latency interfaces (LLI) 255-R, 255-W in the read data path (RDP) 460-R and write data path 460-W, respectively, may be implemented in a similar manner to FIG. 2. In addition, the iterative decoding block 270 and ITI mitigation circuit 280 may be implemented in a similar manner to FIG. 2.

As shown in FIG. 4, the read data path 460-R generates the decoded data for a given track N that is provided to the HDC 210 (FIG. 2). In addition, the generated decoded data for a given track N can optionally be transferred for storage in the write data path 460-W in accordance with the present invention. The read channel 400 includes a shunt path 480 for transferring the decoded data to be stored as cancellation data to the write data path 460-W. In addition, a multiplexer 470 is controlled by DA_METACMD[2], a delayed, data aligned version of METACMD[2], in a similar manner to FIG. 3. The multiplexer 470 allows a selection of either the shunted decoded data from the read data path 460-R or the write data from the HDC 210. In various modes, the HDC 210 provides the write data to the write data path 460-W in a media data format to be stored on the magnetic media 295 (and/or stored as ITI cancellation data in the ITI memory 450), or the read data path 360-R provides decoded data in a media data format to be stored as ITI cancellation data, as controlled by multiplexer 470. In a first exemplary mode, the multiplexer 470 selects the write data from the HDC 210, which is then written to the magnetic media 295 (FIG. 2) in a normal write operation. In a second exemplary mode, the multiplexer 470 selects the shunt path 480 that transfers the decoded data from the read data path 460-R in a media data format that is to be stored as cancellation data in the write data path 460-W. The coded media data is stored in an ITI memory 450 in accordance with an aspect of the present invention and then provided to the ITI mitigation circuit 280 as ITI cancellation data.

It is noted that the media data from the read data path 460-R can be decoded data (e.g., from the output of the LDPC decoder) or it can be non-decoded data (e.g., from the input of the LDPC decoder). The selection can be configured or can be dynamic (selected based on some internal mechanism or computation). For example, if a given sector failed at the LDPC decoder, the input data at the LDPC decoder can be transferred to the write data path 460-W instead of the failed LDPC output data.

The exemplary read channel 400 provides a "control" interface 405 (e.g., control interface wires) from the HDC 210 to the read channel 400, in a similar manner to FIG. 3. The exemplary control interface 405 comprises control signals RDGATE, METACMD[1], METACMD[2] and RETRYGATE.

In the exemplary embodiment of FIG. 4, the coded media data is generated in the read data path 460-R. Thus, the ESR encoder 420-W and an LDPC encoder 430 in the exemplary write data path 460-W are bypassed using bypass path 425 by the media data that is stored in an ITI memory 450 and then provided to the ITI mitigation circuit 280. The ESR encoder 420-W and an LDPC encoder 430 in write data path 460-W are also bypassed by the media data during a write operation, when the media data is written to the magnetic media 295.

As shown in FIG. 4, the ITI mitigation circuit 280 in the read data path 460-R can optionally be bypassed when ITI cancellation is not enabled for a given read operation. Furthermore the ESR encoder 420-R in the read data path 460-R can optionally be bypassed when a media data format is to be recovered.

In the two exemplary modes discussed above in conjunction with FIGS. 3 and 4, the decoded data for a given track N that is provided to the HDC 210 for a read operation is in the same format (user data format in FIG. 3 and media data format in FIG. 4) as the decoded data that is provided to the write data path 360-W, 460-W using the shunt paths 380, 480, respectively, to be stored as ITI cancellation data. hi a further variation, the decoded data can be provided to the HDC 210 in a user data format (e.g., a data format that the HDC 210 can pass to the operating system) while the decoded data can be provided to the write data path 360-W, 460-W in a media data format, or vice versa. This conversion can be handled, for example, using configuration registers, as would be apparent to a person of ordinary skill in the art.

In yet another variation, the ITI mitigation circuit 280 (or another dedicated circuit or process in the read channel 300, 400) can convert the data stored in the ITI memory 350, 450 from any format used for storage to any desired format to be used for ITI mitigation, as would be apparent to a person of ordinary skill in the art.

Figure 5A:
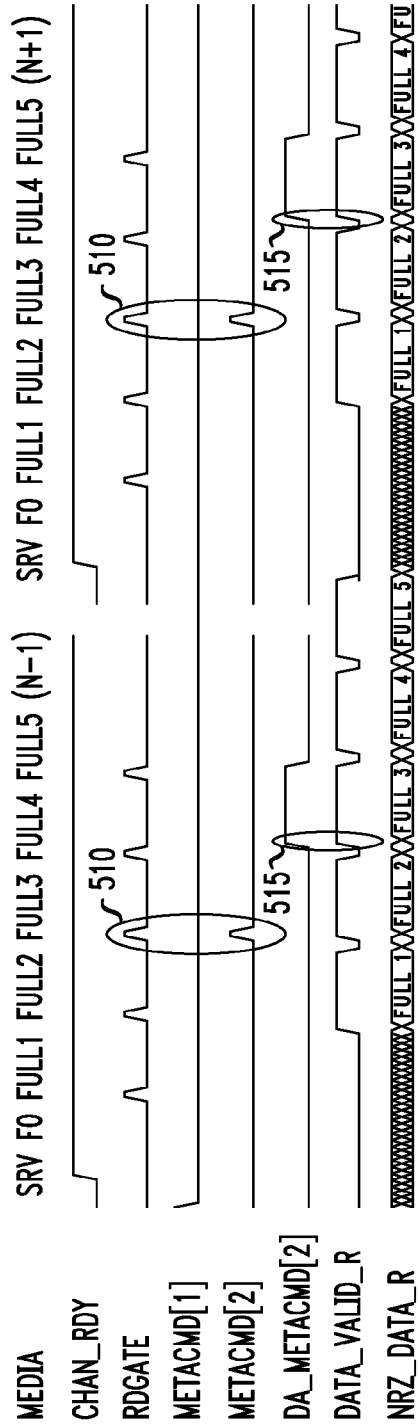
Figure 5B:
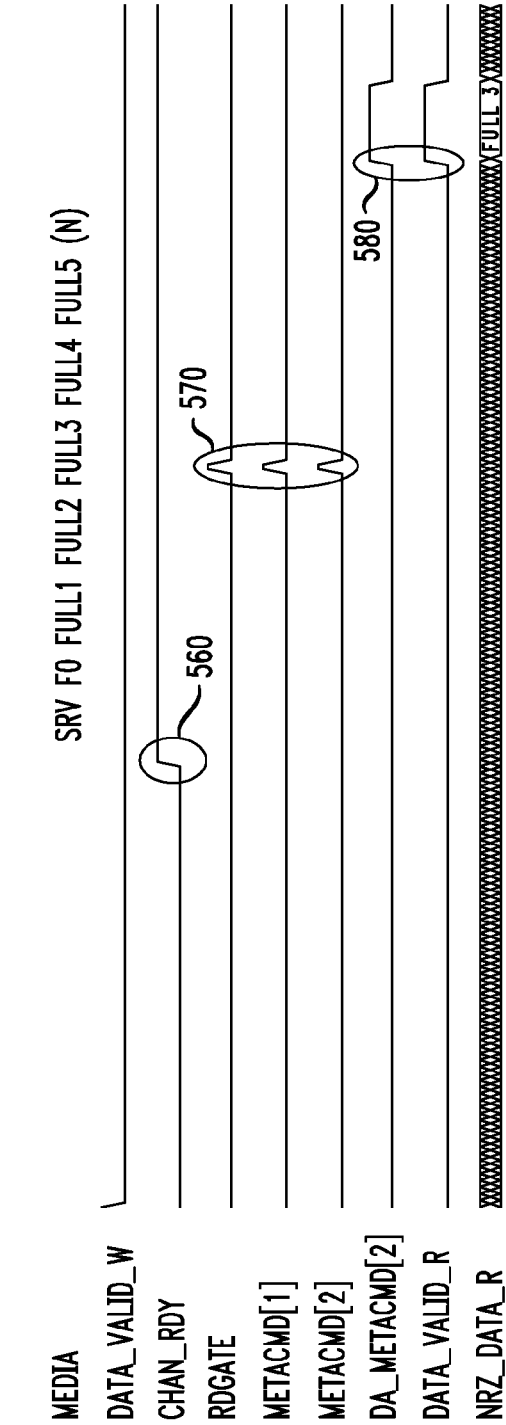

FIGS. 5A and 5B illustrate a number of interface signals 500, 550 as a function of time for the exemplary read channels 300, 400 of FIGS. 3 and 4, respectively, to implement an exemplary automatic two-sided ITI mitigation in accordance with the present invention (for a single sector, FULL3). Generally, in the following figures, the MEDIA signal illustrates what is on the media (a servo, a fragment, or a full sector). The term "FRG" in the figures indicates a fragment of a sector, the term "FULL" indicates a complete sector, and the term "SERVO" indicates a split sector. The CHAN_RDY signal indicates when the channel is ready for a read operation. In addition, the RDGATE signal corresponds to the read gate and initiates a read from the media. The RDGATE signal is active at the start of each sector and sector fragment. In addition, the exemplary ITI control signal, METACMD[2], indicates whether the current read data in the read data path 260-R should be transferred from the read data path 260-R to the write data path 260-W for storage in the ITI memory 350, 450, from where it can subsequently be used as ITI cancellation data.

As discussed herein, the signal METACMD[1] triggers an ITI mitigation with the read or retry (aligned to RDGATE or RETRYGATE signals, respectively). The control signal DA_METACMD[2] is a control signal that is generated in response to the assertion of control signal METACMD[2]. DA_METACMD[2] is delayed to align with the recovered data, which can be significantly later than the RDGATE signal. The assertion of METACMD[2] causes the DA_METACMD[2] pulse to occur later in time (aligned with the data associated with that read). A DATA_VALID_R signal indicates when each read sector has been decoded. The signal NRZ_DATA_R indicates the NRZ data that has been read from the media.

FIG. 5A illustrates the collection of read data signals 500 for a left adjacent track N−1 and a right adjacent track N+1 to a given track N. The left adjacent track N−1 is shown on the left side of FIG. 5A and the right adjacent track N+1 is shown on the right side of FIG. 5A. FIG. 5B illustrates the collection of read data signals 550 for the given track N with ITI mitigation enabled. As discussed hereinafter, a portion of the read data collected during the read operation of the adjacent tracks N−1, N+1 shown in FIG. 5A is stored in accordance with the present invention as cancelation data in the ITI memory 350, 450 and used for two-sided ITI mitigation for the subsequent read operation performed for the given track N. In particular, the read data for sector 3 (FULL3) from the adjacent tracks N−1, N+1 is stored as cancelation data in the ITI memory 350, 450.

As discussed herein, the signal METACMD[1] triggers an ITI mitigation with the read or retry (aligned to RDGATE or RETRYGATE signals, respectively). As shown in FIG. 5A, the read channel 300, 400 performs normal media read operations (i.e., media reads without storage of ITI cancellation data) of the adjacent tracks N−1, N+1 for sectors 1, 2, 4 and 5 by setting the control signal RDGATE=1 and METACMD[2]=0. In addition, the read channel 300, 400 performs read operations of the adjacent tracks N−1, N+1 with storage of sector FULL3 as cancellation data in the ITI memory 350, 450 for sector 3 by setting the control signal RDGATE=1 and METACMD[2]=1 (regions 510 of FIG. 5A). Thus, the sector FULL3 will be transferred to the HDC 210 and also directed into the write data path 360-W, 460-W for storage in the ITI memory 350, 450. The delayed DA_METACMD[2] will be aligned to the decoded data (DATA_VALID_R) (regions 515).

The collection of read data for the given track N, as shown in FIG. 5B, is performed with ITI mitigation enabled (METACMD[1] asserted). The CHAN_RDY signal rises at time 560 to indicate that ITI cancellation data stored in the ITI memory 350, 450, as discussed above, is ready for use. A read operation with ITI mitigation for sector 3 (FULL3) is initiated in FIG. 5B by setting the control signals RDGATE=1 and METACMD[1]=1. In addition, METACMD[2] can optionally be asserted at time 570 as well, if it is desired to store the ITI mitigated data in ITI memory 350, 450 for subsequent use in ITI mitigation. Two-sided cancellation is performed by the ITI mitigation circuit 280 and the recovered data is produced by the read data path 360-R, 460-R and sent to the HDC 210. The DATA_VALID_R signal at time 580 indicates that sector 3 (FULL3) has been successfully decoded (on NRZ_DATA_R; SECTOR_GOOD, not shown, indicates "error free decode").

In addition, if METACMD[2] is asserted at time 570, the ITI mitigated data will be stored in ITI memory 350, 450 for subsequent use in ITI mitigation. The corresponding delayed DA_METACMD[2] will be aligned to the decoded data (DATA_VALID_R) (region 580).

FIGS. 6A and 6B illustrate a number of interface signals 600, 650 as a function of time for the read channel 300, 400 of FIGS. 3 and 4, respectively, to implement an exemplary burst of two single-sided ITI mitigation in accordance with aspects of the present invention. In particular, two single-sided ITI mitigation is performed for sectors 3 and 4 (FULL3 and FULL4). FIG. 6A illustrates the collection of read data signals 600 for a left adjacent track N−1. FIG. 6B illustrates the collection of read data signals 650 for the given track N with ITI mitigation enabled. As discussed hereinafter, a portion of the read data collected during the read operation of the adjacent track N−1, shown in FIG. 6A, is stored in accordance with the present invention as cancellation data in the ITI memory 350, 450 and used for ITI mitigation for the subsequent read operation performed for the given track N. In particular, the read data for sector 3 (FULL3) and sector 4 (FULL4) from the adjacent track N−1 is stored as cancelation data in the ITI memory 350, 450.

As discussed herein, the signal METACMD[1] triggers an ITI mitigation with the read or retry (aligned to RDGATE or RETRYGATE). As shown in FIG. 6A, the read channel 300, 400 performs normal media read operations (i.e., media reads without storage of ITI cancellation data) of the adjacent track N−1 for sectors 1, 2 and 5 by setting the control signal RDGATE=1 and METACMD[2]=0. In addition, the read channel 300, 400 performs read operations of the adjacent track N−1 with storage of sector FULL3 and sector FULL4 as cancellation data in the ITI memory 350, 450 for sectors 3 and 4 by setting the control signal RDGATE=1 and METACMD[2]=1 (regions 610 and 620 of FIG. 6A). Thus, the sectors FULL3 and FULL4 will be transferred to the HDC 210 and also directed into the write data path 360-W, 460-W for storage in the ITI memory 350, 450. The delayed DA_METACMD[2] will be aligned to the decoded data (DATA_VALID_R) (regions 615).

The collection of read data for the given track N, as shown in FIG. 6B, is performed with ITI mitigation enabled (METACMD[1] asserted). The CHAN_RDY signal rises at time 660 to indicate that ITI cancellation data stored in the ITI memory 350, 450, as discussed above, is ready for use. A read operation with ITI mitigation for sector 3 (FULL3) is initiated at time 670 in FIG. 6B by setting the control signals RDGATE=1 and METACMD[1]=1. In addition, a read operation with ITI mitigation for sector 4 (FULL4) is initiated at time 675 in FIG. 6B by setting the control signals RDGATE=1 and METACMD[1]=1. In addition, METACMD [2] can optionally be asserted at time 675, if it is desired, for example, to store the ITI mitigated data for sector 4 (FULL4) in ITI memory 350, 450 for subsequent use in ITI mitigation. ITI mitigation is performed by the ITI mitigation circuit 280 and the recovered data is produced by the read data path 360-R, 460-R and sent to the HDC 210. The DATA_VALID_R signal at time 680 for sector 3 and at time 685 for sector 4 indicates that sectors 3 and 4 (FULL3 and FULL4) have been successfully decoded (on NRZ_DATA_R; SECTOR_GOOD, not shown, indicates "error free decode").

In addition, if METACMD[2] is asserted for sector 4 at time 675, the ITI mitigated data will be stored in ITI memory 350, 450 for subsequent use in ITI mitigation. The corresponding delayed DA_METACMD[2] will be aligned to the decoded data (DATA_VALID_R) (region 685).

It is noted that ITI mitigation using additional tracks, such as triple-sided ITI mitigation can be performed in accordance with the present invention, as would be apparent to a person of ordinary skill in the art.

FIGS. 7A and 7B illustrate a number of interface signals 700, 750 as a function of time for the read channel 300, 400 of FIGS. 3 and 4, respectively, to implement an exemplary burst of two successive single-sided ITI mitigation for the same sector, in accordance with aspects of the present invention. In particular, two successive single-sided ITI mitigation is performed for sector 3 (FULL3), one side at a time. FIG. 7A illustrates the collection of read data signals 700 for a left adjacent track N−1 and a right adjacent track N+1. FIG. 7B illustrates the collection of read data signals 750 for the given track N with ITI mitigation enabled. As discussed hereinafter, a portion of the read data collected during the read operation of the adjacent tracks N−1 and N+1, shown in FIG. 7A, is stored in accordance with the present invention as cancellation data in the ITI memory 350, 450 and used for ITI mitigation for the subsequent read operation performed for the given track N. In particular, the read data for sector 3 (FULL3) from the adjacent tracks N−1 and N+1 is stored as cancelation data in the ITI memory 350, 450.

As discussed herein, the signal METACMD[1] triggers an ITI mitigation with the read or retry (aligned to RDGATE). As shown in FIG. 7A, the read channel 300, 400 performs normal media read operations (i.e., media reads without storage of ITI cancellation data) of the adjacent track N−1 for sectors 1, 2, 4 and 5 by setting the control signal RDGATE=1 and METACMD[2]=0. In addition, the read channel 300, 400 performs read operations of the adjacent track N−1 with storage of sector FULL3 and sector FULL4 as cancellation data in the ITI memory 350, 450 for sector 3 by setting the control signal RDGATE=1 and METACMD[2]=1 (regions 710 of FIG. 7A). Thus, the sector FULL3 for tracks N−1 and N+1 will be transferred to the HDC 210 and also directed into the write data path 370-W, 470-W for storage in the ITI memory 350, 450. The delayed DA_METACMD[2] will be aligned to the corresponding decoded data (DATA_VALID_R) (regions 715).

The collection of read data for the given track N, as shown in FIG. 7B, is performed with ITI mitigation enabled (METACMD[1] asserted). The CHAN_RDY signal rises at time 760 to indicate that ITI cancellation data stored in the ITI memory 350, 450, as discussed above, is ready for use. A read operation with single-sided ITI mitigation for sector 3 (FULL3) is initiated at time 770 in FIG. 7B by setting the control signals RDGATE=1 and METACMD[1]=1.

A second decoding of sector 3 is attempted with single-sided ITI mitigation initiated at time 775 in FIG. 7B by setting the control signals RETRYGATE=1 and METACMD[1]=1, to recycle the internally stored data, perform the second side ITI cancellation, and recover the data. In addition, METACMD[2] can optionally be asserted at time 775, if it is desired, for example, to store the ITI mitigated data for sector 3 (FULL3) in ITI memory 350, 450 for subsequent use in ITI mitigation. ITI mitigation is performed by the ITI mitigation circuit 280 and the recovered data is produced by the read data path 370-R, 470-R and sent to the HDC 210. The DATA_VALID_R signal at time 780 for sector 3 indicates that sector 3 (FULL3) has been successfully decoded (on NRZ_DATA_R; SECTOR_GOOD at time 790 indicates an "error free decoding").

In addition, if METACMD[2] is asserted for sector 3 at time 775, the decoded data from track N will be stored in ITI memory 350, 450 for subsequent use in ITI mitigation. The corresponding delayed DA_METACMD[2] will be aligned to the decoded data (DATA_VALID_R) (region 785).

Aspects of the present invention support all modes of operation described in U.S. patent application Ser. No. 13/250,246, filed Sep. 30, 2011, entitled "Hardware-Based Methods and Apparatus for Inter-Track Interference Mitigation in Magnetic Recording Systems," incorporated by reference herein. For example, the following modes of operation are supported by the embodiments described herein, based on the present disclosure and the disclosure in U.S. patent application Ser. No. 13/250,246, as would be apparent to a person of ordinary skill in the art:

Single-sided ITI mitigation (retry or on-the-fly (OTF));
Complete selectability on which sectors are collected into the write data path 360-W, 460-W and which sectors are not collected;
Double-sided automatic ITI mitigation;
Multiple successive single-sided ITI mitigation, one said at a time;
Average, then one sided ITI mitigation;
Single-sided ITI mitigation, then average;
Media data format from read data path 360-R, 460-R and ITI memory 350, 450; and
User data format from read data path 360-R, 460-R and write data path 360-W, 460-W converts user data to media data format for storage in ITI memory 350, 450.

As previously indicated, the arrangements of magnetic recording systems and read channels, as described herein, provide a number of advantages relative to conventional arrangements. Again, it should be emphasized that the above-described embodiments of the invention are intended to be illustrative only. In general, the exemplary magnetic recording systems can be modified, as would be apparent to a person of ordinary skill in the art, to incorporate ITI mitigation schemes that provide ITI mitigation data using the write data path. In addition, the disclosed techniques for ITI mitigation can be employed in any magnetic recording system, such as a virtual storage system/storage virtualization system, such as a Redundant Array of Independent Disks (RAID) system.

The interface and dataflow mechanisms described herein support additional operating modes and configurations without modification, as would be apparent to a person of ordinary skill in the art. For example, the disclosed ITI mitigation techniques may be implemented in conventional drives with multiple side-tracks that interfere as shown (a potential use for N-sided mitigation); shingled or conventional drives with aligned or misaligned sectors (a potential use of known data);

and conventional drives that have unintentional squeezing (such that the drives needs ITI recovery despite it not being a shingled drive). Generally, misaligned sectors occur when the data of adjacent sectors are not aligned. For example, referring to FIG. 1, if the center track 110-2 did not align with one or more of the adjacent tracks 110-1, 110-3, the tracks are said to be misaligned. In the event of misaligned tracks, the present invention permits ITI mitigation of the sector a given track using the portions of the adjacent track that are aligned to the sector of the given track, regardless of the sectors that the aligned portions of the adjacent track belong to.

In addition, while the exemplary embodiments employ control signals, such as the metacmd[2] control signal, as interface pins, in further variations, one or more of the control signals can be replaced by any internal mechanism that substantially identifies for capture, an individual sector being read within a stream of sector reads. For example, a simple register can be employed indicating "loop this one sector." In another variation, if a sector identifier exists (i.e., sectors are numbered or otherwise uniquely identified), then a register that indicates the "sector by number" or "sector by unique identifier" can be employed.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

We claim:

1. A method for obtaining inter-track interference (ITI) cancellation data in a magnetic recording system, comprising:

obtaining read data from a magnetic recording medium in said magnetic recording system; and storing said obtained read data as inter-track interference cancellation data in a memory in a read channel of said magnetic recording system based on a control signal, wherein said control signal selectively indicates whether said read data should be stored as said inter-track interference cancellation data in said memory.

2. The method of claim 1, further comprising the step of providing said inter-track interference cancellation data to an inter-track interference mitigation circuit in said read channel using at least a portion of a write data path, wherein said write data path is used to write data to said magnetic recording medium in said magnetic recording system.

3. The method of claim 2, wherein said inter-track interference cancellation data is provided to said inter-track interference mitigation circuit based on a first control signal indicating whether inter-track interference cancellation data should be used for a given read operation.

4. The method of claim 1, wherein said storage of said inter-track interference cancellation data is responsive to said control signal selectively indicating whether current read data should be stored in said memory.

5. The method of claim 4, wherein said obtaining step selectively obtains said inter-track interference cancellation data from a read data path based on said control signal selectively indicating whether current read data should be stored in said memory, wherein said read data path is used to read data from a magnetic medium in said magnetic recording system.

6. The method of claim 4, wherein said obtaining step selectively obtains said inter-track interference cancellation data from a read data path based on said control signal that is substantially aligned with recovered data, wherein said read data path is used to read data from a magnetic medium in said magnetic recording system.

7. The method of claim 2, wherein said providing step is performed during a read operation.

8. The method of claim 1, wherein said obtaining step selectively obtains said inter-track interference cancellation data from a read data path using a multiplexer, wherein said read data path is used to read data from said magnetic recording medium in said magnetic recording system.

9. The method of claim 8, wherein said multiplexer selects one or more of data from said read data path and data from a hard disk controller.

10. The method of claim 9, wherein said selected data from said read data path is provided to a write data path for storage in said memory, wherein said write data path is used to write data to a magnetic medium in said magnetic recording system.

11. The method of claim 10, wherein said selected data from said read data path is in a user data format and wherein said method further comprises the step of converting said selected data to a media data format.

12. The method of claim 10, wherein said selected data from said read data path is in a media data format.

13. The method of claim 1, wherein said memory is in a write data path of said read channel, wherein said write data path is used to write data to said magnetic recording medium in said magnetic recording system.

14. The method of claim 1, wherein said memory is in a read data path of said read channel.

15. The method of claim 1, wherein said inter-track interference cancellation data comprises one or more of user data, media data, ADC data and Y-data.

16. The method of claim 1, further comprising the step of performing inter-track interference mitigation upon a failure of a read operation of one or more sectors.

17. The method of claim 1, wherein a two-sided inter-track interference mitigation for a given sector is first performed using cancellation data for a first adjacent sector followed by inter-track interference mitigation using cancellation data for a second adjacent sector.

18. The method of claim 1, wherein said stored inter-track interference cancellation data is provided from said memory during a read operation to an inter-track interference mitigation circuit in said read channel when inter-track interference mitigation is enabled.

19. The method of claim 1, wherein said obtained inter-track interference cancellation data is obtained from a read data path in said read channel.

20. The method of claim 1, wherein said obtained inter-track interference cancellation data is one or more of detected data obtained from a read data path and decoded data obtained from said read data path, wherein said read data path is used to read data from said magnetic recording medium in said magnetic recording system.

21. A read channel of a magnetic recording system, comprising:
means for obtaining read data from a magnetic recording medium in said magnetic recording system; and
a memory for storing said obtained read data as inter-track interference cancellation data in a memory in a read channel of said magnetic recording system based on a control signal, wherein said control signal selectively indicates whether said read data should be stored as said inter-track interference cancellation data in said memory.

22. The read channel of claim 21, further comprising an inter-track interference mitigation circuit in said read channel and wherein said inter-track interference cancellation data is provided to said inter-track interference mitigation circuit using at least a portion of a write data path, wherein said write data path is used to write data to said magnetic medium in said magnetic recording system.

23. The read channel of claim 22, wherein said inter-track interference cancellation data is provided to said inter-track interference mitigation circuit based on a first control signal indicating whether inter-track interference cancellation data should be used for a given read operation.

24. The read channel of claim 21, wherein said inter-track interference cancellation data is stored in said memory in response to said control signal selectively indicating whether current read data should be stored in said memory.

25. The read channel of claim 24, wherein said inter-track interference cancellation data is selectively obtained from a read data path based on said control signal selectively indicating whether current read data should be stored in said memory, wherein said read data path is used to read data from a magnetic medium in said magnetic recording system.

26. The read channel of claim 24, wherein said inter-track interference cancellation data is selectively obtained from a read data path based on said control signal that is substantially aligned with recovered data, wherein said read data path is used to read data from a magnetic medium in said magnetic recording system.

27. The read channel of claim 22, wherein said inter-track interference cancellation data is provided to said inter-track interference mitigation circuit during a read operation.

28. The read channel of claim 21, further comprising a multiplexer and wherein said inter-track interference cancellation data is selectively obtained from a read data path using said multiplexer, wherein said read data path is used to read data from said magnetic recording medium in said magnetic recording system.

29. The read channel of claim 28, wherein said multiplexer selects one or more of data from said read data path and data from a hard disk controller.

30. The read channel of claim 29, wherein said selected data from said read data path is provided to a write data path for storage in said memory, wherein said write data path is used to write data to a magnetic medium in said magnetic recording system.

31. The read channel of claim 30, wherein said selected data from said read data path is in a user data format and wherein said read channel further comprises means for converting said selected data to a media data format.

32. The read channel of claim 30, wherein said selected data from said read data path is in a media data format.

33. The read channel of claim 21, wherein said memory is in a write data path of said read channel, wherein said write data path is used to write data to said magnetic recording medium in said magnetic recording system.

34. The read channel of claim 21, wherein said memory is in a read data path of said read channel.

35. The read channel of claim 21, wherein said inter-track interference cancellation data comprises one or more of user data, media data, ADC data and Y-data.

36. The read channel of claim 30, further comprising an inter-track interference mitigation circuit in said read channel for performing inter-track interference mitigation upon a failure of a read operation of one or more sectors.

37. The read channel of claim 21, wherein a two-sided inter-track interference mitigation for a given sector is first performed using cancellation data for a first adjacent sector followed by inter-track interference mitigation using cancellation data for a second adjacent sector.

38. The read channel of claim 21, wherein said inter-track interference cancellation data is provided from said memory during a read operation to an inter-track interference mitigation circuit in said read channel when inter-track interference mitigation is enabled.

39. The read channel of claim 21, wherein said obtained inter-track interference cancellation data is obtained from a read data path in said read channel.

40. The read channel of claim 21, wherein said obtained inter-track interference cancellation data is one or more of detected data obtained from a read data path and decoded data obtained from said read data path, wherein said read data path is used to read data from said magnetic recording medium in said magnetic recording system.

41. A read channel of a magnetic recording system, comprising:
means for obtaining read data from a magnetic recording medium in said magnetic recording system;
a memory for storing said obtained read data as inter-track interference cancellation data; and
means for selectively storing said obtained read data as said inter-track interference cancellation data in said memory based on a control signal, wherein said control signal selectively indicates whether said read data should be stored in said memory.

42. The read channel of claim 41, wherein said inter-track interference cancellation data is provided from said memory to an inter-track interference mitigation circuit in said read channel based on a second control signal indicating whether said inter-track interference cancellation data should be used for a given read operation.

43. The read channel of claim 41, wherein said inter-track interference cancellation data is selectively obtained from a read data path based on said control signal selectively indicating whether current read data should be stored in said memory, wherein said read data path is used to read data from said magnetic recording medium in said magnetic recording system.

44. The read channel of claim 41, wherein said inter-track interference cancellation data is selectively obtained from a read data path based on said control signal that is substantially aligned with recovered data, wherein said read data path is used to read data from said magnetic recording medium in said magnetic recording system.

* * * * *